Figure 1:
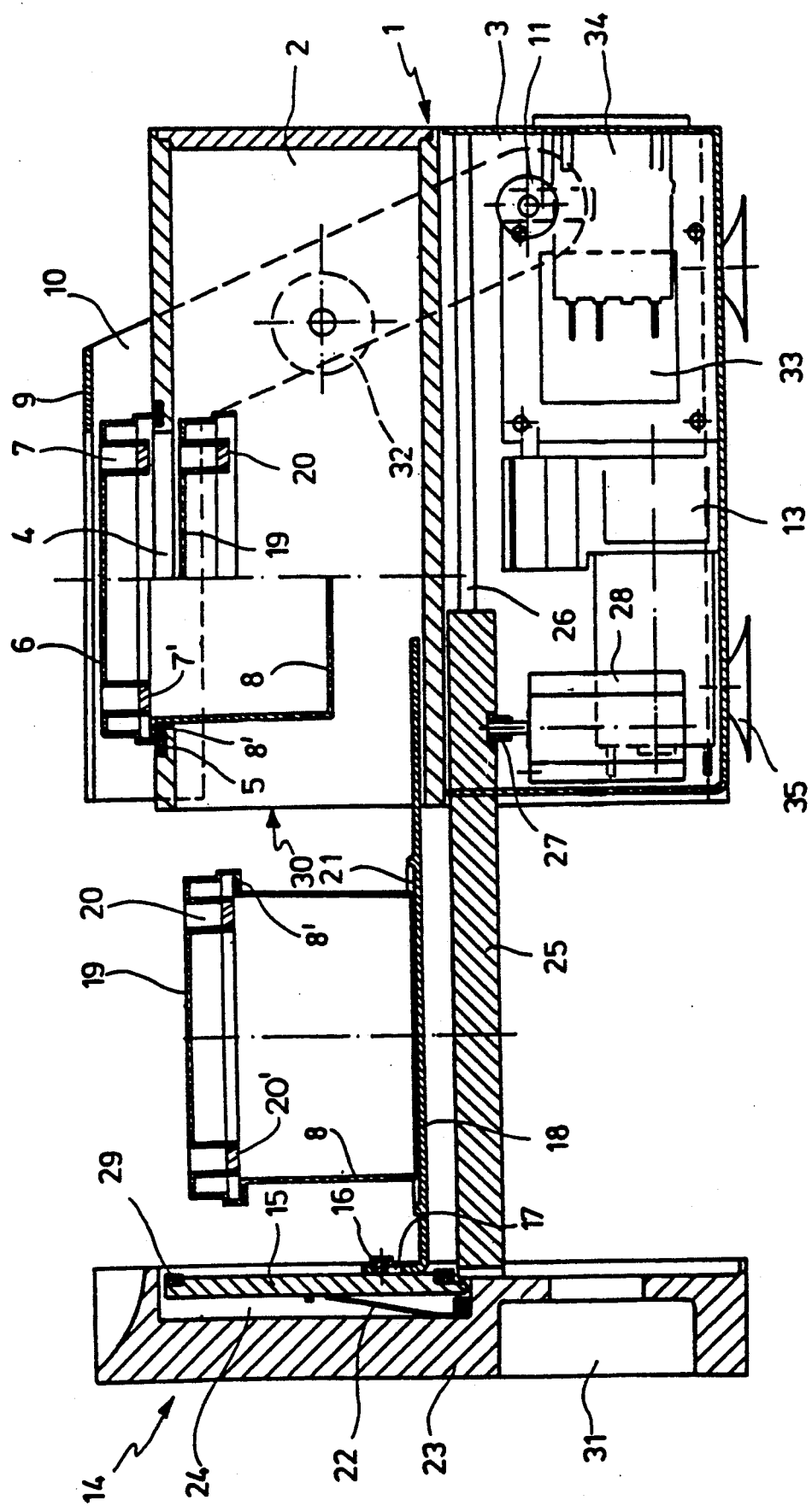

United States Patent [19]

Lurz

[11] Patent Number: 5,201,348

[45] Date of Patent: Apr. 13, 1993

[54] EVACUATING APPARATUS FOR A MICROTITRATION DIAPHRAGM PLATE

[75] Inventor: Werner Lurz, Kaltenkirchen, Fed. Rep. of Germany

[73] Assignee: Eppendorf-Netheler-Hinz GmbH, Hamburg, Fed. Rep. of Germany

[21] Appl. No.: 843,907

[22] Filed: Feb. 27, 1992

[30] Foreign Application Priority Data

Mar. 7, 1991 [DE] Fed. Rep. of Germany ....... 4107262

[51] Int. Cl.$^5$ .......................... B65B 43/42; B67C 3/00
[52] U.S. Cl. ........................................ 141/130; 141/7; 141/65; 141/59; 422/100
[58] Field of Search .................. 141/130, 67, 69, 7, 141/65, 59; 422/100, 101; 222/152; 73/864.91; 210/416.1

[56] References Cited

U.S. PATENT DOCUMENTS

| | | | |
|---|---|---|---|
| 4,461,328 | 7/1984 | Kenney | 422/100 |
| 4,537,231 | 8/1985 | Hasskamp | 141/130 |

*Primary Examiner*—Henry J. Recla
*Assistant Examiner*—Steven O. Douglas
*Attorney, Agent, or Firm*—Anderson Kill Olick & Oshinsky

[57] ABSTRACT

An evacuating apparatus for applying suction to the underside of a microtitration diaphragm plate including a plurality of diaphragm receptacles each having an open top and a diaphragm bottom, the evacuating apparatus including a housing defining an evacuation chamber having an aperture provided in a top wall of said chamber and having associated therewith peripheral gasket means for supporting a rim of said microtitration diaphragm plate, and further comprising a carrier including support means for supporting a microtitration recipient plate including a plurality of closed bottom receptacles each having an open top and a closed bottom, said carrier being adapted to be displaced between an access position wherein said recipient plate may be positioned onto or removed from said support means, and a loading position wherein said recipient plate is disposed within said chamber below said diaphragm plate so that said diaphragm receptacles of said diaphragm plate vertically register with said closed bottom receptacles of said recipient plate, said carrier having a face plate which sealingly engages a peripheral edge of an access opening of said chamber when said carrier is in its loading position.

20 Claims, 3 Drawing Sheets

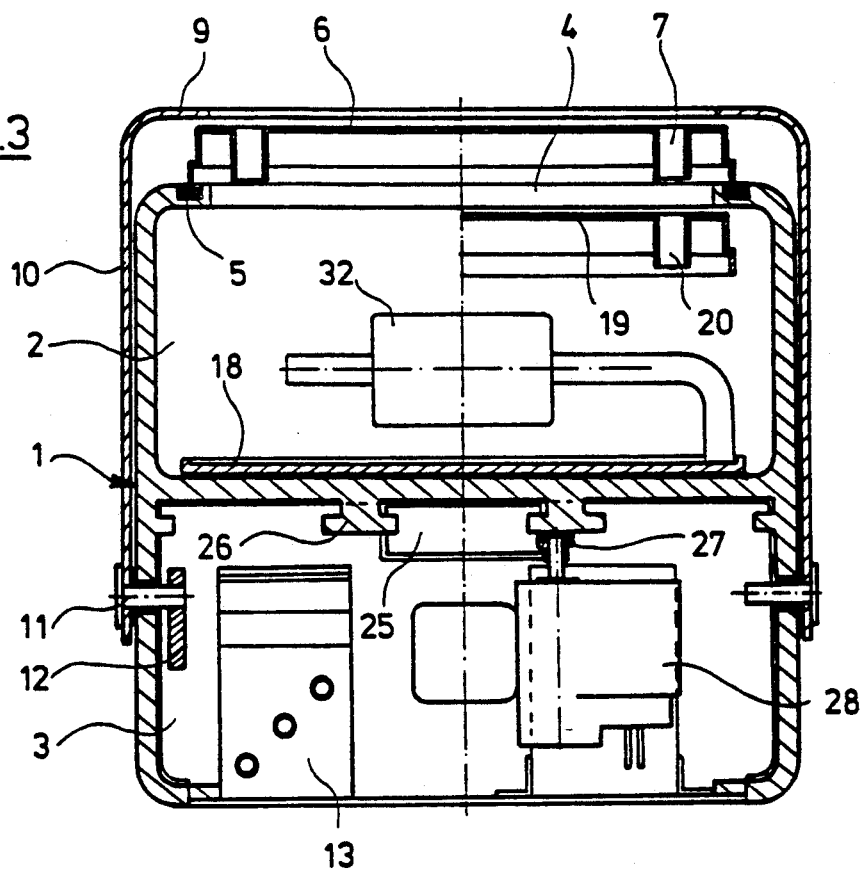
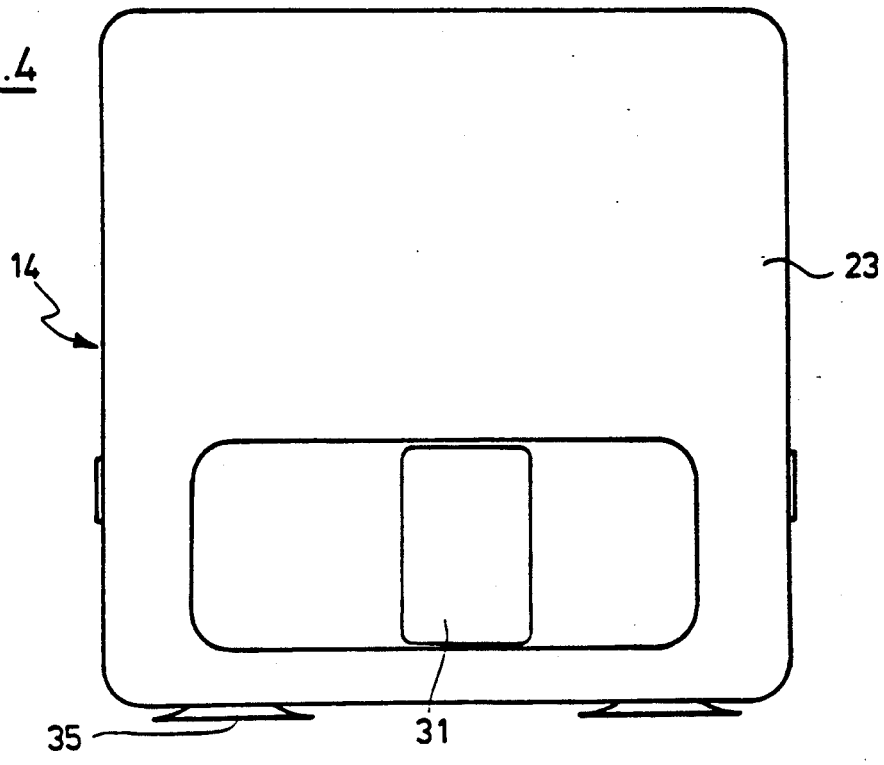

EVACUATING APPARATUS FOR A MICROTITRATION DIAPHRAGM PLATE

The present invention relates to an evacuation apparatus for applying suction to the underside of a microtitration diaphragm plate having a plurality of receptacles each having an open top and a diaphragm bottom.

German patent application 34 25 762 discloses a biochemical multipurpose test plate apparatus wherein a microtitration diaphragm plate comprises an upper mask having a plurality of discrete holes and a continuous microporous film disposed below the mask. The upper mask and microporous film are urged—through a perforated seal and a lower mask—against a base plate having a central recess so as to form a micro-titration recipient plate. Various applications of the combination of the diaphragm plate and the recipient plate are described in the German patent application. In particular, the diaphragm may perform a filtering function for liquid samples or may selectively react with components of the samples. Handling of such test plate apparatus is rather cumbersome because it must be assembled from a plurality of members for each test. Furthermore, the prior art apparatus is not suited for applications where the recipient plate needs to be changed e.g. for multistage reaction testing. Examples thereof are immunological tests wherein the antigens of the test solutions in a first step are bound to an antibody diaphragm and in a second step are evacuated together with a colour reagent into a microtitration recipient plate having a glass bottom for photometric measurements. Furthermore, the recipient plate may be replaced for obtaining pure DNA; to this end DNA is collected for example on a glass diaphragm and thereafter is evacuated by means of a special solution into the microtitration recipient plate.

An improved range of applications is provided by micro-titration diaphragm plates having an integral diaphragm for closing the receptacles for the liquid test samples; in order to avoid lateral intermixing of the test probes each receptacle may be associated with its own diaphragm separated from the diaphragms of adjacent receptacles. Such diaphragm plates generally have 24, 48 or 96 receptacles and cooperate with a pan or a microtitration recipient plate having a similar number of recepticles. The present invention relates in particular to an evacuation apparatus for diaphragm plates and recipient plates of this type.

It is an object of the present invention to provide an improved evacuation apparatus for microtitration plates which apparatus is easy to handle and allows use thereof without any substantial risk of contamination of the liquid test samples.

An evacuation apparatus according to the present invention includes an apparatus for applying suction to the underside of a microtitration diaphragm plate including a plurality of diaphragm receptacles each having an open top and a diaphragm bottom, the evacuating apparatus including a housing defining an evacuation chamber having an aperture provided in a top wall of said chamber and having associated therewith peripheral gasket means for supporting a rim of said microtitration diaphragm plate, and further comprising a carrier including support means for supporting a microtitration recipient plate including a plurality of closed bottom receptacles each having an open top and a closed bottom, said carrier being adapted to be displaced between an access position wherein said recipient plate may be positioned onto or removed from said support means, and a loading position wherein said recipient plate is disposed within said chamber below said diaphragm plate so that said diaphragm receptacles of said diaphragm plate vertically register with said closed bottom receptacles of said recipient plate, said carrier having a face plate which sealingly engages a peripheral edge of an access opening of said chamber when said carrier is in its loading position.

In the evacuation apparatus of the present invention the microtitration recipient plate may be inserted into and removed from the suction chamber by means of the carrier in a very simple and efficient manner. Inserting or removal of the recipient plate does not cause any change in position of the horizontal gasket means for the diaphragm plate so that it may remain in its position on the apparatus when the recipient plate is removed. It should be appreciated that the diaphragm plate and the recipient plate when they are in their loading positions are precisely in registry to each other. The apparatus of the present invention has extremely simple handling characteristics, there being no substantial risk of contamination of the liquid test samples. The apparatus of the present invention is particularly suited for integration in an automated testing sequence.

Figure 2:
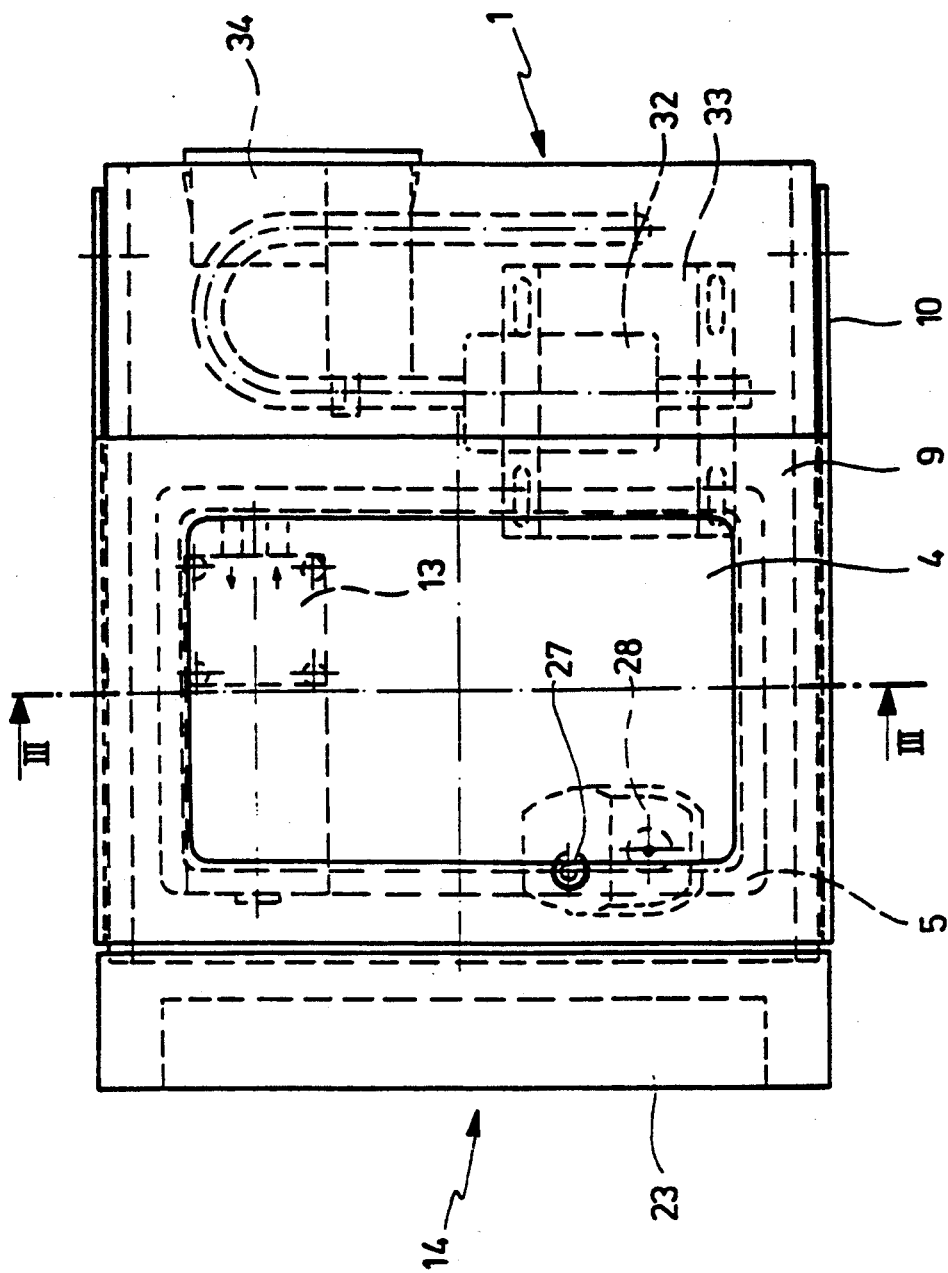

Other objects as well as features and advantages of the present invention will be more fully understood from the following detailed description of an exemplary but preferred embodiment shown by way of example in the accompanying drawings, wherein:

FIG. 1 is a longitudinal section of the apparatus having a drawer which is in an access position;

FIG. 2 an elevation of the apparatus with the drawer being in a loading position;

FIG. 3 a cross-section of the apparatus along line III—III in FIG. 2;

FIG. 4 a front view of the apparatus.

The evacuation apparatus shown in FIGS. 1 to 4 includes a box-like housing 1 defining an evacuation chamber 2 and a further chamber 3. The evacuation chamber 2 has a rectangular aperture 4 in a top wall, which aperature 4 is surrounded by gasket means 5 disposed in a peripheral groove in the outside of housing 1.

Gasket means 5 is adapted to support a rim of a standard microtitration diaphragm plate 6 from below and is of L-shaped cross-section with an upright leg of the L providing lateral guidance of diaphragm plate 6. Diaphragm plate 6 is of standard structure and includes a plurality of cylindrical receptacles 7 each having an open top and a bottom closed by a diaphragm 7, The receptacles 20 are designed to receive liquid test probes. For simplicity reasons only a pair of receptacles 7 are shown in FIG. 1, while it should be understood that diaphragm plate 6 may include a substantial number, i.e. 24, 48 or 96, of receptacles.

An urging plate 9 is disposed above the diaphragm plate 6 so as to overlap the upper rim of the diaphragm plate 6. Urging plate 9 is adapted to be pivoted into engagement with diaphragm plate 9 by means of a pair of arms 10 which are pivotally mounted to the side walls of housing 1 in the area of further chamber 3. Within chamber 3 pivotal arm 10 has a pivotal pin 11 connected to an actuating lever 12 for actuating a vacuum pump 13 disposed within further chamber 3 (see FIG. 3).

A drawer 14 includes a face plate 15 and a bottom member 18 releasably connected to face plate 15 by means of headed pins 16 and matingly shaped slots 17. As shown in FIG. 1 bottom member 18 is adapted to support a pan 8 having a rim 8' forming a support for a microtitration recipient plate 19. Similiar to diaphragm plate 6 recipient plate 19 includes a plurality of receptacles 20 each of which has an open top and a closed bottom 20'. For simplicity reasons only two receptacles 20 are shown in FIG. 1.

The drawer 14 is displaceable between an access position wherein the receipient plate 19 is disposed outside of chamber 2 and may be easily removed from above (FIG. 1), and a loading position wherein the recipient plate 19 is disposed within chamber 2 below diaphragm plate 6 so that receptacles 20 are in vertical registry with receptacles 7 (as shown on the righthand side of FIGS. 1 and 3). To ensure precise registry bottom member 18 is provided with upstanding guiding portions 21 for the pan 8.

The face plate 15 of the drawer 14 is mounted to a face plate carrier 23 by means of a flat spring 22 and is disposed within a recess 24 of face plate carrier 23. The face plate carrier 23 is secured to a rail-shaped linear guide element 25 extending parallel to diaphragm plate 6 along the direction of movements of the drawer 14. Guide element 25 is guided on either side by guide elements 26 of T-cross-section along the top wall of further chamber 3 and is provided with a lateral rack which is in engagement with a pinion 27 of a displacement motor 28 disposed within the further chamber 3. By means of displacement motor 28 the drawer 14 is movable from its access position (shown in FIG. 1) to its loading position (shown in FIG. 2) wherein gasket means 29 provided on the inner side of face plate 15 sealingly engages a peripheral edge of an access opening 30 of evacuation chamber 2 (see FIG. 1). When the drawer 14 is in its loading position it may be locked in its position by a locking lever (not shown) which extends through a recess 31 of the face plate carrier 23. As an alternative locking of drawer 14 may be obtained by blockage of displacement motor 28.

While in the embodiment shown in the drawings the drawer 14 is lineally movable, it should be understood that bottom member 18 could be secured to a table which is rotatable in a plane parallel to diaphragm plate 6, or to a flap which is pivotal in a plane perpendicular to diaphragm plate 6. In this case bottom member 18 would be connected to rotating or pivoting means disposed outside of chamber 2. A rotatable table, in particular if it has an axis of rotation in the central area of the face plate, would enable simultaneous removal and insertion of a plurality of recipient plates while having an angle of rotation of e.g. 180°. In case of a flap which is pivotal in a plane perpendicular to the diaphragm plate such flap could form the face plate and would have its pivotal axis below the evacuation chamber. To ensure a horizontal position of the recipient plate during pivotal movements of the flap the latter may carry a support which is kept in an upright position while the inclination of the flap changes.

The vaccum pump 13 is arranged to draw air through a sterilized filter 32 within chamber 2 and receives electrical power via a transformator 33 within further chamber 3 which furthermore includes an electrical connection means 34 for supplying power to displacement motor 28. Furthermore, an interface for external control may be provided. The apparatus on its underside is provided with suction cups 35 of rubber for dampening vibrations of displacement motor 28 and the drive of vaccum pump 13 and to prevent inadvertent changes of position.

In operation the drawer 14 is moved to its loading position within chamber 2 by displacement motor 28. When the drawer is in its loading position, face plate 15 sealingly closes chamber 2 by engagement of gasket means 29 surrounding access opening 30. Furthermore, recipient plate 19 supported on pan 8 will be disposed below diaphragm plate 6 so that receptacles 20 are in vertical registry with receptacles 7. When liquid test samples will have been poured into receptacles 7, a vaccum of e.g. 0.5 bar will be created in chamber 2 by vacuum pump 13. Such vacuum will draw the test sample liquid from receptacles 7 through diaphragm bottoms 7' into receptacles 20 of recipient plate 19. When drawer 14 will have been returned to its access position, recipient plate 19 may be removed, and a new recipient may be positioned upon pan 8.

If it is not necessary to collect the test sample liquid in individual receptacles 20 of a recipient plate 19, pan 8 could be used without recipient plate 19 so that the test sample liquid would drip into pan 8. Furthermore, the apparatus could be used in the manner shown on the lefthand side of chamber 2 where pan 8 has been positioned directly in aperture 4, with pan 8 being supported by means of a radially outwardly extending flange 8' upon the rim surrounding aperture 4. In this case the test sample liquid would drip downwards into pan 8 without any assistance of vaccum.

I claim:

1. An evacuating apparatus for applying suction to the underside of a microtitration diaphragm plate including a plurality of diaphragm receptacles each having an open top and a diaphragm bottom, the evacuating apparatus including a housing (1) defining an evacuation chamber (2) having an aperture (4) provided in a top wall of said chamber (2) and having associated therewith peripheral gasket means (5) for supporting a rim of said microtitration diaphragm plate (6), and further comprising a carrier (18) including support means (8') for supporting a microtitration recipient plate (19) including a plurality of closed bottom receptacles (20) each having an open top and a closed bottom, said carrier (18) being adapted to be displaced between an access position wherein said recipient plate (19) may be positioned onto or removed from said support means (8'), and a loading position wherein said recipient plate (19) is disposed within said chamber (2) below said diaphragm plate (6) so that said diaphragm receptacles (7) of said diaphragm plate (6) vertically register with said closed bottom receptacles (20) of said recipient plate (19), said carrier (18) having a face plate (15) which sealingly engages a peripheral edge of an access opening (30) of said chamber (2) when said carrier (18) is in its loading position.

2. An evacuation apparatus as defined in claim 1 which includes a plurality of apertures (4) for receiving a plurality of diaphragm plates (6) and a plurality of associated chambers (2) for a plurality of recipient plates (19).

3. An evacuation apparatus as defined in claim 2 wherein said plurality of evacuation chambers (2) are adapted to be connected to a vacuum pump (13) by valve switch means.

4. An evacuation apparatus as defined in any of claims 1 to 3, wherein said gasket means comprises a gasket member (5) having an upstanding leg portion for engagement with said diaphragm plate (6).

5. An evacuation apparatus as defined in any of claims 1 to 4 including an urging plate (9) adapted to be pivoted between a release position allowing to position or remove said diaphragm plate (6) onto or from said gasket means (5) and an operative position wherein said urging plate (9) urges said diaphragm plate (6) downwards into engagement with said gasket means (5).

6. An evacuation apparatus as defined in claim 5 including switch means for energizing said vacuum pump (13) connected to said evacuation chamber (2), said urging plate (9) being adapted to actuate said switch means when the urging plate (9) is in its operative position.

7. An evacuation apparatus as defined in any of claims 1 to 5, wherein said carrier (18) is displaceable in a direction parallel to said diaphragm plate (6).

8. An evacuation apparatus as defined in any of claims 1 to 7, wherein said carrier (18) is provided on a drawer (14) or a table pivotal in a plane parallel to said diaphragm plate (6) or on a flap pivotal in a plane perpendicular to said diaphragm plate (6).

9. An evacuation apparatus as defined in any of claims 1 to 8, wherein said support means (8,) for said recipient plate (19) is carried by said carrier (18) releasably secured to said face plate (15).

10. An evacuation apparatus as defined in any of claims 1 to 9, wherein said carrier (18) has associated therewith a guide element (25) or a pivoting element connected to a said face plate (15), said guide elementor pivoting element including lineal guide means (26) of pivotal guide means outside of said chamber (2).

11. An evacuation apparatus as defined in claim 10, wherein said guide element (25) or pivoting element is connected to a face plate support (23) by resilient means (22) allowing for relative movements between said face plate support (23) and said face plate (15) in the direction of guiding movements as enabled by said guide element or pivoting element.

12. An evacuation apparatus as defined in any of claims 1 to 11, wherein said face plate (15) includes gasket means (29) adapted to engage said housing(1) for sealingly closing said access opening (30) of said chamber (2).

13. An evacuation apparatus as defined in any of claims 1 to 12 including a pan (8) adapted to be inserted into said aperture (4) in said top wall of said chamber (2) or adapted to be disposed on said carrier (18), said pan (8) having an outwardly extending peripheral flange comprising said support means (8'), which peripheral flange (8') engages said gasket means (5) of said aperture (4) when said pan (8) is inserted into said aperture (4).

14. An evacuation apparatus as defined in any of claims 1 to 13, wherein said carrier (18) is adapted to be locked when it is in its loading position.

15. An evacuation apparatus as defined in claim 14, wherein said carrier (18) has associated therewith a locking lever having an actuating leg extending through said face plate (15) or said face plate support (23) and a locking leg engaging a locking pin when the locking lever is in a locking position.

16. An evacuation apparatus as defined in claim 12 or claim 13, wherein said carrier is arranged to bias a return spring when it is moved towards its loading position.

17. An evacuation apparatus as defined in any of claims to 14, wherein said carrier (18) is associated with said guide element (25) extending in the direction of displacement and being in engagement with a pinion (27) of a displacement motor (28).

18. An evacuation apparatus as defined in any of claims 1 to 17, wherein a further chamber (3) is provided within said housing (1), which further chamber (3) includes said vacuum pump (13), electrical control and supply means (34, 33), said guide element (26) or pivoting element, locking means, a return spring and/or a displacement motor (28).

19. An evacuation apparatus as defined in any of claims 1 to 18, wherein a sterilized filter (32) is disposed in said evacuation chamber (2) and is connected to said vacuum pump (13) by a connection line sealingly extending through a wall of said evacuation chamber (2).

20. An evacuation apparatus as defined in any of claims 1 to 17 including rubber feet preferrably comprising suction cups (35).

* * * * *